Jan. 28, 1964  H. W. NEIDHARDT ETAL  3,119,313
AUTOMOTIVE MULTI-WHEELED ROLLERS
Filed Dec. 28, 1959  3 Sheets-Sheet 1

INVENTORS:
HEINZ-WERNER NEIDHARDT,
GERHARD HAUSKE
BY
Mestern & Rollin
ATTORNEYS

Jan. 28, 1964   H. W. NEIDHARDT ETAL   3,119,313
AUTOMOTIVE MULTI-WHEELED ROLLERS
Filed Dec. 28, 1959   3 Sheets-Sheet 2

INVENTORS:
HEINZ-WERNER NEIDHARDT
GERHARD HAUSKE
BY

*Mestern & Rollin*
ATTORNEYS

Jan. 28, 1964  H. W. NEIDHARDT ETAL  3,119,313
AUTOMOTIVE MULTI-WHEELED ROLLERS
Filed Dec. 28, 1959  3 Sheets-Sheet 3

INVENTORS:
HEINZ-WERNER NEIDHARDT,
GERHARD HAUSKE
BY
Mestern & Hollin
ATTORNEYS

United States Patent Office 3,119,313
Patented Jan. 28, 1964

3,119,313
AUTOMOTIVE MULTI-WHEELED ROLLERS
Heinz Werner Neidhardt, Limburg (Lahn), and Gerhard Hauske, Diez (Lahn), Germany, assignors to Scheid Maschinenfabrik G.m.b.H., Limburg (Lahn), Germany
Filed Dec. 28, 1959, Ser. No. 862,375
5 Claims. (Cl. 94—50)

The present invention concerns a self-propelled multi-wheeled roller, more especially a road roller, acting as a compressor producing a uniform compressive pressure with all wheels, the loaded frame of which rests on three bearing points on the wheel sets.

Known road rollers fitted with wide iron rollers do not solve this problem, since their wide supporting surface does not allow any displacement of the upper layer of the ground to fill in holes and unevennesses. It has been proposed for each wheel of a roller to be resiliently suspended and it was possible thereby to ensure only that the individual wheel be adapted to the uneven ground, whereas the load distribution to the individual wheels is irregular as the wheel springs have different spring pressures owing to the different wheel positions. It has, moreover, been proposed for the wheels to be interconnected by means of a cable compensation system, hence to cause the change of position of one wheel forcibly to effect a change of position of the other wheel. This construction is unsuccessful owing to non-uniform compression.

A further known self-propelled road roller has a driving shaft with five individual wheels, each two outer wheels being combined to form wheel pairs and the fifth single wheel being arranged between the wheel pairs and designed as independently mounted driving wheel. Consequently the load of the road roller is supported at three points on the driving axis. Since it is also necessary for at least one load-transfer bearing to be provided on the non-driven axle, the load distribution to the wheel sets is uncertain, as a definite load distribution is obtainable only with three bearing points all together.

There has also been proposed a construction of a self-propelled road roller wherein the steering wheel set has an odd number of wheels with pneumatic tires and the driving wheel set an even number of wheels with pneumatic tires. The frame of the road roller is supported in one bearing point on the steering wheel set and in two points on the driving wheel set. Even if the load distribution in this arrangement is definite, it has the decisive disadvantage that the driving wheel set is not dirigible, so that on cornering this road roller does not achieve a complete overlap. Moreover, this construction requires besides several differential gears for each wheel pair in addition also two bevel gears between which articulated shafts are provided. As the wheel pairs are mounted on perpendicular yoke arms it is necessary for the drive of the wheel pairs to be led horizontally thereto, whereby at least a part of the drive is loaded not only by the torque to be transmitted but also by the weight of the road roller.

An object of the invention is to provide a roller which not only compresses the loosely poured covering but simultaneously levels uneven points.

The invention will be described, by way of example, with reference to the accompanying drawing in which.

Figure 4:
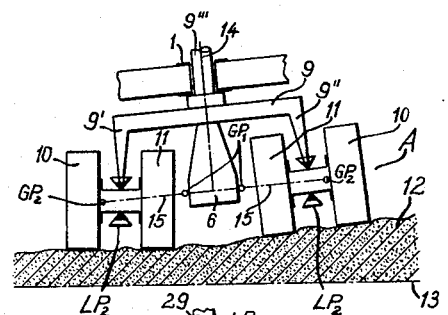
FIG. 4 is a diagrammatic view of the mounting of a set of driving wheels for the road roller.

A set A of driving wheels are mounted at the front of a frame 1 of a road roller and an undriven set B of wheels are mounted at the rear of the frame 1 if the direction given by a motor 2 and a gearing 3 to the steering wheel 4 is defined as the forward direction of travel. A steering rod 5 leads from the steering or driving wheel set A to the wheel set B which allows both wheel sets to be steered in such a manner that, even when cornering, full coverage of the ground by means of the wheels is ensured. Both front and rear wheels are, consequently, controlled by linkage 5. All wheels are so set relative to one another that the gaps between the wheels of one set are covered by those of the others. In known arrangements the wheels of the front axle alternately cover the gap of the wheels of the rear axle, whilst in the arrangement shown in the drawing the two center wheels of the wheel set B are mounted in juxtaposition and the two outer wheels of the wheel set B are mounted with an intermediate clearance from the inner wheels which corresponds to one wheel width. The space corresponding to that required by the two central wheels of the wheel set B, is occupied in the driving wheel set A by a differential 6. The weight of the road roller is supported at a bearing point $LP_1$ on the wheel set B and on two bearing points $LP_2$ on the wheel set A. The bearing point $LP_1$ is constituted by a yoke 7 rotatably mounted on the frame 1 of the road roller by means of a pivotally mounted yoke frame 8 on which there are provided swivel bearings in which the wheels of the wheel set B are mounted.

The bearing points $LP_2$ in the driving wheel set A are disposed on downwardly directed arms 9' and 9" of a bifurcated yoke 9 having a vertical yoke pin 9''' so as to be rotatably mounted on the frame 1 of the road roller. The differential 6 is connected to the yoke 9 in such a way that it carries no load.

The drive of the outer wheels 10 and inner wheels 11 of the wheel set A is shown in FIG. 4. The individual wheel pairs 10 and 11, mounted in the swivel bearings $LP_2$, are independent of the position of the road roller and can assume different positions caused by the nature of the ground surface 12; the horizontal is indicated by the line 13 given by way of comparison. A driving shaft 14, passing through the bearing pin 9''' in exactly the same manner as the differential 6, follows the swivel movement of the yoke 9 which is rotatably mounted in the frame 1 for bridging the swivel differences existing between the differential 6 and the wheel pairs 10 and 11, driven shafts 15, which at hinge points $GP_1$ and $GP_2$ are articulated with the differential 6 and the outer wheels 10. The driven shafts 15 are elongated transmission elements which pass through the axles of the inner wheels 11, which may be driven directly by means of a rigid connection with the wheels 10 associated therewith. It is, however, also possible for the wheel pairs to be so guided with one another that they execute mutually identical swivel movements, without driving the inner wheel 11 so that the latter, when cornering, can rotate at a peripheral speed corresponding to the radius of its track.

Figure 5:
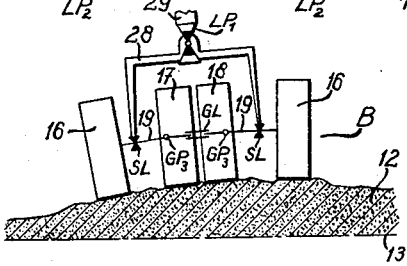
FIG. 5 is a diagrammatic view of the mounting of a set of undriven wheels.
Figure 1:
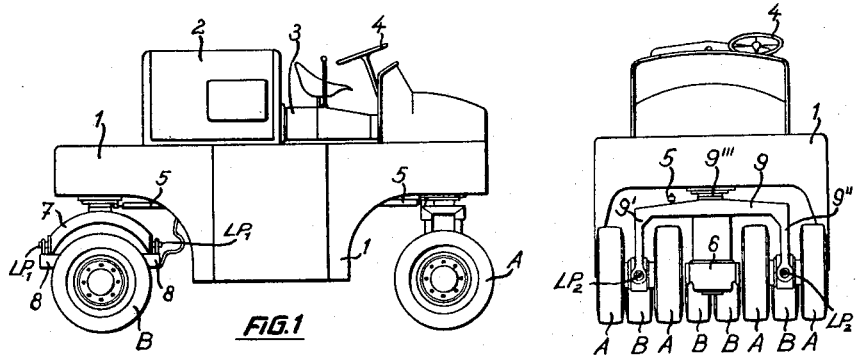
FIG. 1 is a side elevation of a leveling roller, more especially, a road roller constructed in accordance with the invention.

The mounting of the undriven wheel set B is shown diagrammatically in FIG. 5. The weight of the road roller supported on the bearing point $LP_1$ is distributed to the two swivel bearings SL and hence to outer wheels 16 and inner wheels 17 and 18. Articulated shafts 19 are mounted, in the swivel bearings SL which connect the outer wheels 16 with the inner wheels 17 or 18 associated therewith. Each of these articulated shafts 19 is provided with only one articulating point GP₃ at each of the inner wheels 17 or 18. These inner wheels 17 and 18 which are co-axially mounted, have means for compensating their relative axial separation symbolized by a sliding bearing GL. It is thus possible for each wheel or the wheel pair 17 and 18 of the wheel set B, even in the case of uneven or curved ground, to be adapted to the position of the ground and exert a constant compression thereagainst. In comparison with the ground surface 12 having a curvature, the line 13 constitutes the horizontal.

Figure 6:
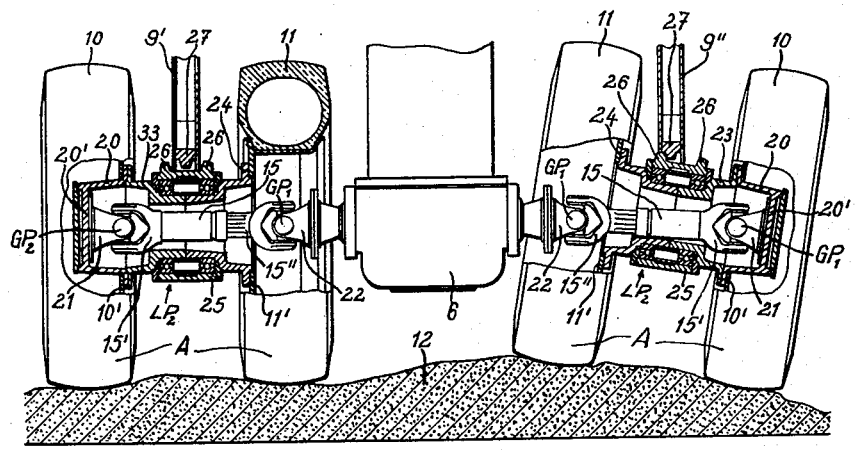
FIG. 6 is an enlarged section through the driving wheels.

The structural development of the driving wheel set A is shown in FIG. 6. A cap-like insert 20 is mounted on the wheel's disc 10', a base 20' of the insert 20 being set back in the opposite direction to the differential 6. One part 21 of the articulating point GP₂ is flanged on the inside of the base 20' for connecting the articulating point GP₂ with the articulated shaft 15. Links 22 of the articulated point GP₁ are rigidly connected with the differential 6. Each articulated shaft 15 is constructed in two parts, one part being in the form of a sleeve 15' and the other part being a rod 15'' mounted in the sleeve 15'.

Bush 15' and pin 15'' are constructed in the manner of a splined shaft connection so that, despite the compensation of length of the articulated shaft 15 caused by the swivel movement of the wheel pair 10 and 11, a non-slip drive transmission from the differential 6 to the outer wheel 10 is ensured.

One elongated spacing sleeve 23 is rigidly connected with each wheel disc 10' of the outer wheels 10 or the cap-like inserts 20 thereof. Each sleeve 23 is axially adjacent a distance sleeve 24, which latter is fixed to a wheel disc 11' of each inner wheel 11. If the wheels 11 are to be driven by the wheels 10 then it is necessary for the pairs of distance sleeves 23 and 24 to be rigidly interconnected. If the wheels 11 are not driven by wheels 10 the pairs of sleeves 23 and 24 are axially interlinked only by means of the swivel bearing LP₂, thus permitting them to rotate at different peripheral speeds. The distance sleeves 24 have bores conically widening in the direction towards the differential 6, so as to prevent the articulated shafts 15 which are disposed in the sleeves with peripheral clearance, when the wheel pairs 10 and 11 have reached their limiting position, from striking against the inner periphery thereof.

Ball bearings which are mounted and centred in each bearing 25 of the swivel bearings LP₂ are shrunk on to the adjacent outer peripheries of the distance sleeves 23 and 24. These bearings 25 have two bearing pins (not shown) which are pivotally mounted in the yoke arms 9' and 9''. Two stops in the form of teeth 26, arranged on the circumference of the bearings 25, limit the deflection of the wheel pairs 10 and 11 relative to a tooth-shaped stop 27 provided on the ends of the yoke arms 9' and 9''. The separation of the stops 26 and the thickness of the stop 27 affect the dimensioning of the bore diameter of the distance sleeves 23 and 24.

Figure 3:
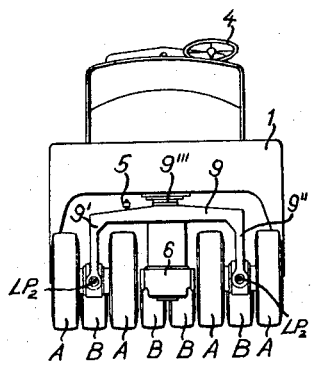
FIG. 3 is a corresponding front elevation.
Figure 2:
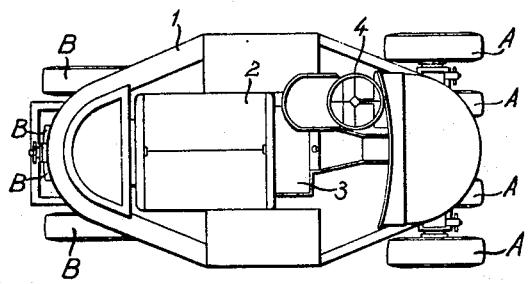
FIG. 2 is a corresponding plan view.

The distance between each of the wheels 10 and 11 is approximately equal to one wheel width, whilst the distance between the two inner wheels 11 is approximately equal to two wheel widths. In alignment with these gaps between the wheels there are arranged the wheels of the undriven wheel set B as shown in FIG. 3. Hence the complete coverage of the ground to be compressed is ensured. It is possible for the wheels to incorporate pneumatic or solid rubber tires and even to comprise steel wheels. It is clearly evident that the differential 6, mounted on the yoke 9, contrary to conventional vehicle design is freed from receiving forces originating from the load of the vehicle, thus causing it merely to serve for transmitting the driving moment to the wheels.

Figure 7:
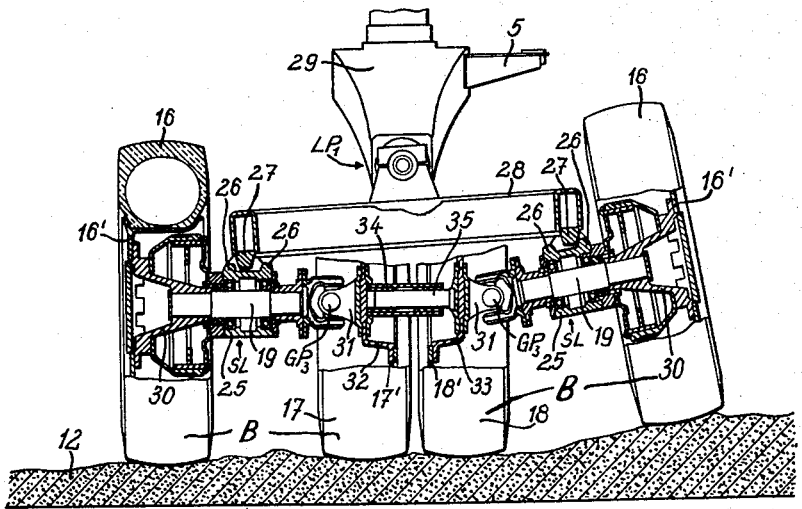
FIG. 7 is a section through the undriven wheels.

In FIG. 7 there is shown a constructional example for the mounting or the undriven wheel set B. The swivel bearings SL are structurally of identical design as are the swivel bearings LP₂ shown in FIG. 6. The pins (not shown) of the bearings 25 are pivotally mounted in a yoke frame 28, which in turn is pivotally mounted in the bearing point LP₁ on a rotatable yoke 29 on the frame 1 of the road roller. These bearings 25 serve to receive the articulated shafts 19. The rotary movement of the bearings 25 is limited by means of stops 26 which cooperate with opposite stops 27 arranged on the yoke frame 28. The articulated shaft 19 mounted in each bearing is rigidly connected at its extreme end with a wheel disc 16' of the outer wheel 16 associated therewith. In the example shown in FIG. 7 this firm connection is carried out by means of the boss 30 which is tightly shrunk on to the articulated shaft 19. A part 31 of each joint GP₃ is flanged to the outer surface of a flange 32 or 33 mounted on wheel discs 17' and 18' respectively of the wheels 17 or 18. The inner surface of the flange 32 bears a pin 34 which is rotatably mounted on a sleeve 35 mounted on the inner surface of the flange 33 and adapted to be axially guided. The flanges 32 and 33 are cap-shaped to allow sufficient clearance for the sleeve 35 and the pin 34. The wheels 17 and 18, owing to their axial guidance, constantly assume the same swivel positions which are independent of the swivel position of the outer wheels 16. To prevent the swivel movement of the outer wheels 16 from affecting the inner wheels 17 and 18, free wheel clearance is made possible by means of compensating the pin 34 and the sleeve 35. This arrangement moreover also permits different peripheral speeds between the wheels 17 and 18, which occur particularly when cornering or when the ground is uneven.

The weight of the road roller shown in FIG. 7 subjects the articulated shafts 19 to bending stress, wherefor it is advisable to support the end faces of the pins of the joints GP₃ to enable the load forces created at this point to be absorbed without any substantial friction losses.

It is also possible to employ pneumatic rubber tires, resilient or steel wheels. When using pneumatic rubber tires there may also be provided a device, by means of which the air pressure in the tires may be varied during travel or at standstill. Hence it is possible for the compressive strength of the wheels to be varied according to the state of the ground.

Figure 8:
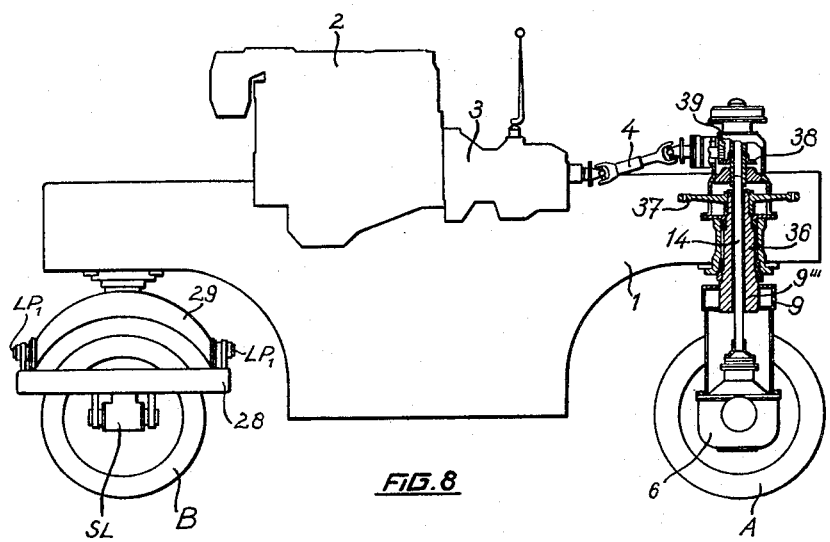
FIG. 8 is a side elevation of a road roller corresponding to FIG. 1 showing the steering column of the driving wheel set in section.

In FIG. 8 there is shown the drive of the differential 6 which, as already described, with the driving shaft 14 passes vertically through the yoke pin 9'''. This pin 9''' is guided in a sliding bearing 36 by means of which the weight of the road roller is transmitted by the frame 1 to the yoke 9.

A steering rod system 37, mounted on the pin 9''', leads to the steering wheel by means of a cable or a chain. Above this steering rod system there are arranged a set of bevel gears 38 and 39 on the driving shaft 14, which is driven by an articulated shaft 40.

We claim:

1. In a ground-compacting machine, in combination, a weighted frame; first and second support means connected to said frame at spaced locations; a powered first set of two axially spaced wheel pairs rotatably journaled to said first support means, and a nonpowered second set of four axially spaced wheels rotatably journaled to said second support means, all of said wheels being of substantially equal width, the wheels of each of said sets being disposed symmetrically relative to a generally vertical median plane of said frame transverse to the wheel axes, those wheels of said pairs of said first set which are proximal to said plane being spaced apart by a distance equal to substantially twice the width of a wheel; power means including a differential rigidly suspended on said first support means between said proximal wheels for directly driving at least one wheel of each of said pairs, and a drive shaft for said differential extending therefrom substantially vertically through said first support means to said frame, said second set including at least two wheels aligned with said differential and a wheel aligned with the spaces between the wheels of each of said pairs, said first support means including a first yoke journaled to said frame for rotation about a substantially vertical axis and having a pair of downwardly extending arms equidistant from said plane on opposite sides thereof; steering means operatively connected to said first yoke for yawingly displacing the latter; and balancing means including said yoke and said second support means for distributing the weight of said frame substantially equally to all of said wheels, said balancing means having three load-supporting pivots with generally longitudinal axes, one of said pivots lying in said plane, the remaining ones of said pivots being longitudinally offset from said one pivot and spaced on opposite sides of said plane, said second support means including a second yoke having spaced arms and articulated to said frame at said one load-supporting pivot, each of said pairs of wheels of said second set being rotatably and oscillatably mounted on a respective arm of said second yoke, each of said wheel pairs of said first set being articulated to a respective one of said arms of said first yoke at one of said remaining pivots, each of said pairs of wheels of said first set being provided with a spacing sleeve interconnecting the wheels thereof in coaxial alignment, the sleeves of each of said wheel pairs of said first set being articulated to the respective arm of said frame at said one of said remaining pivots, said power means further comprising a respective extensible transmission element swiveled to said differential and to said outer wheels at opposite extremities of the respective sleeve and passing therethrough with peripheral clearance in substantially all relative positions of said element and said sleeve.

2. The combination according to claim 1 wherein said transmission elements are telescopingly extensible.

3. In a ground-compacting vehicle, in combination a weighted chassis; a first and a second pair of driving wheels spacedly mounted on said chassis generally in axial alignment; drive means mounted on said chassis and including a differential disposed intermediate said pairs of wheels for rotating the latter, said differential having a pair of output shafts each extending in the direction of one of said pairs of wheels, support means including first and second elongated spacing sleeves rigid with the wheels of said first and second pairs, respectively, and coaxially securing same together, bearing means exterior of each of said sleeves journaling the latter to said chassis for rotation about the axis of the respective pair of wheels, pivot means on said chassis for articulating each of said bearing means thereto for angular displacement about respective generally horizontal axes, and a respective extensible elongated transmission element extending through each of said sleeves while being pivotally connected at its inner end with the respective output shaft and at its outer end with the outer wheel of each pair.

4. In a ground-compacting vehicle, in combination, a chassis; a support operably connected to said chassis and having a pair of spaced arms mounted for rotary steering movement on said chassis; spaced pairs of wheels in generally axial alignment, the wheels of each of said pairs being mounted in spaced relationship on a common hollow sleeve, each of said sleeves being rotatably mounted on a respective one of said arms for oscillating movement in a vertical plane; a differential carried by said support intermediate said spaced pairs of wheels, said differential having at least one pair of output shafts extending laterally on opposite sides of said differential; and an extensible elongated transmission element in each of said sleeves universally coupled at its inner end to a respective one of said output shafts and at its outer end to the outer wheel of each of said pairs.

5. A vehicle as defined in claim 4, further comprising a second support carried by said chassis remote from the first mentioned support; a pair of inner wheels mounted on said second support; a telescopical inner shaft axially interconnecting said inner wheels; a pair of outer wheels mounted on said second support with lateral spacing from said inner wheels; and a respective outer wheel shaft secured to each of said outer wheels and universally coupled with said inner wheel shaft; said second support being pivotally connected with said chassis for angular displacement relative thereto about a substantially horizontal axis.

References Cited in the file of this patent

UNITED STATES PATENTS

| 1,078,538 | Crompton | Nov. 11, 1913 |
| 1,369,977 | McLaren | Mar. 1, 1921 |
| 2,024,184 | Ritchie | Dec. 17, 1935 |
| 2,443,147 | Ritchie | June 8, 1948 |
| 2,510,817 | Greiner | June 6, 1950 |

FOREIGN PATENTS

| 465,493 | Great Britain | May 7, 1937 |
| 267,637 | Switzerland | July 1, 1950 |
| 681,325 | Great Britain | Oct. 22, 1952 |
| 1,069,517 | France | Feb. 10, 1954 |